UNITED STATES PATENT OFFICE 1,979,752

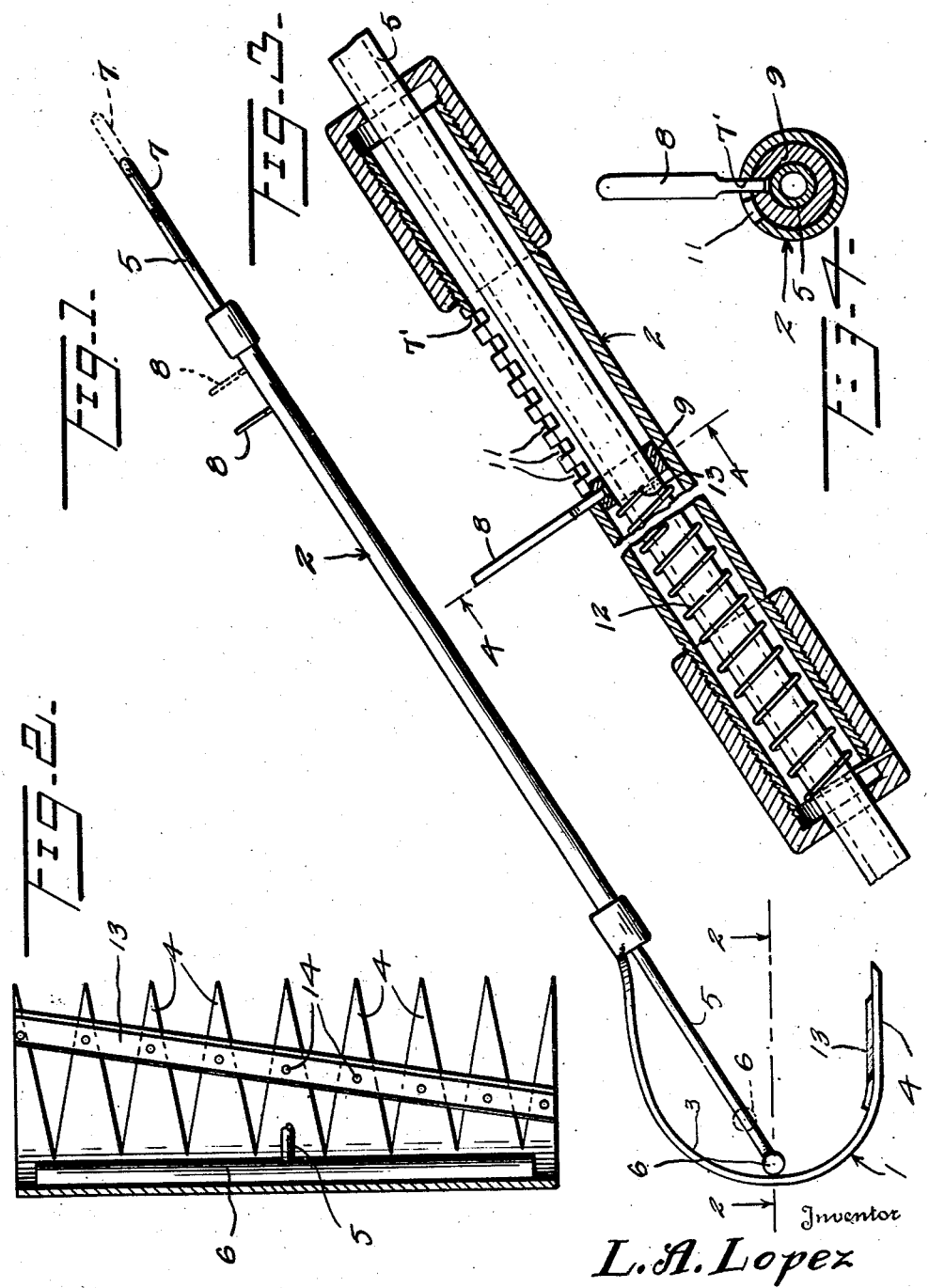

RAKING AND PICKING UP TOOL

Leonard A. Lopez, Wilmington, Calif.

Application November 11, 1933, Serial No. 697,670

3 Claims. (Cl. 55—10)

This invention relates to improvements in garden implements and pertains particularly to a raking device.

The primary object of the present invention is to provide a weed rake having associated therewith means for picking up and holding the weeds whereby the latter may be readily transferred to a receptacle.

A still further object of the invention is to provide a rake and pick-up means having a novel mechanism for controlling the picking up and holding of leaves or weeds after the same have been gathered together.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a detail side elevation of a device constructed according to the embodiment of this invention.

Figure 2 is an enlarged sectional view taken on the line 2—2 of Figure 1.

Figure 3 is a fragmentary enlarged longitudinal section partly in detail taken through the handle.

Figure 4 is a sectional view taken on the line 4—4 of Figure 2.

Referring to the drawing wherein like numerals of reference designate corresponding parts throughout the several views, the numeral 1 indicates generally the head portion of the weeder device embodying the present invention while the numeral 2 designates the handle therefor.

The head 1 comprises an arcuate body 3 which is preferably formed of sheet metal and along one longitudinal edge of the body are formed the pointed teeth 4. This sheet metal body constitutes a receiver for weeds or the like when the device is in use, the teeth 4 operating as rakes to pick up the cut weeds from the ground.

The handle 2 is of tubular design and is secured at one end in any suitable manner to the longitudinal edge of the body 3 opposite the edge in which the teeth 4 are formed and at a point intermediate the ends thereof. As will be seen, the upper or top part of the body 3 curves slightly upwardly from the handle and then curves forwardly and downwardly so that the forward end of the handle, which is open, will be disposed in such a manner that a shaft 5, which is slidably disposed therein may be projected forwardly into the interior of the head. This shaft at its forward end has formed integral therewith the cross bar 6 which is designed to be brought into contact with the inner face of the body 3, as illustrated.

The opposite end of the shaft 5 projects from the free end of the tubular handle 2 and terminates in the ring 7 which serves as a means for gripping the shaft so that the same may be readily moved longitudinally. The openings through the ends of the tubular handle 2 may be of sufficient size only to permit the snug passage of the shaft 5 therethrough. Adjacent the outer end of the handle 2, there is formed in the wall thereof the elongated opening 7' and projecting through this opening, is a lever 8, which at its inner end is secured to a ring 9 which surrounds and is slidable upon the shaft 5. This ring is adapted to have circumferential movement on the shaft 5 so that the handle or lever 8 may be moved into and out of any one of the notches 11 after making the necessary adjustment longitudinally of the shaft.

The ring 9 is normally engaged by one end of a coil compression spring 12 which surrounds the shaft and which is secured thereto, as indicated at 13. The other end of this spring is secured to the handle 2 in the manner illustrated. Since the normal tendency of the spring is to expand, it will thus be seen that it will constantly tend to urge the shaft 5 rearwardly of and in the handle 2 so as to remove the head 6 from engagement with the portion 3 of the device. The end of the spring against which the ring 9 abuts thus operates as a shoulder and it will be readily apparent that the ring 9 may be easily rotated about the shaft 5 in order to engage the lever 8 in one of the notches in the handle.

Disposed to extend from one end of the head plate 3 to the other across the teeth 4 and arranged obliquely of the row of teeth, is a knife or cutting blade 13, which is detachably secured to the teeth 4 in any suitable manner, as for example, by the use of the countersunk screws 14.

From the foregoing description, it will be readily apparent that in the use of the weeder device, the shaft 5 will be drawn rearwardly or urged rearwardly by the spring 11 so as to remove the portion 6 from against the head 1 and in this position, when the toothed portion of the head is drawn over the surface of the ground, the weeds will be cut away and at the same time raked up so as to collect in the concave portion of the head.

After the concave portion has become sufficiently filled with the cut weeds, the operator forces the handle 8 forwardly so as to compress the spring 12 and also force the bar 6 against the weeds and clamp them against the inner surface of the tool head. The weeds may then be readily lifted with the tool head and the latter placed over a receptacle designed to receive the weeds and upon the disengagement of the handle 8 from the notch 11 in which it is engaged, they will be released by the bar and deposited.

It will also be apparent and understood that while the present invention has been described in association with means for cutting weeds or the like, it may be readily employed for gathering up leaves or other material which may be lying loose upon the ground.

What is claimed is:—

1. A device of the character described, comprising an elongated arcuate imperforate body, teeth formed along one longitudinal edge thereof, a handle secured at one end to the other longitudinal edge, said handle being tubular, a shaft extending through and shiftable in said tubular handle, a bar secured transversely of the forward end of the shaft and opposing the concave surface of the body, a lever carried by the shaft and passing laterally through an opening in the wall of the hollow handle, means engageable by said lever for securing the same in a selected position of adjustment longitudinally of the handle, and spring means connected with the shaft and normally tending to shift the same in one direction through said handle.

2. A device of the character described, comprising an elongated arcuate body, teeth formed along one longitudinal edge of the body, a tubular handle secured at one end to the opposite longitudinal edge of the body, a shaft extending through and shiftable in the tubular handle, a bar carried by the shaft at one end and disposed in opposed relation to the concave side of the body, said handle having an opening through the wall thereof adjacent its free end, notches formed along one edge of said opening, a ring member surrounding said shaft, a lever carried by the ring member and extending through the opening in the handle for selective engagement in said notches, a spring surrounding said shaft and secured at one end thereto and having its other end secured to the handle, said ring being movable circumferentially and longitudinally on the shaft and further engaging the end of the spring secured to the shaft to facilitate movement of the shaft and compression of the spring.

3. A device of the character described comprising an elongated arcuate body, teeth formed along one longitudinal edge of the body, a tubular handle secured at one end to the opposite longitudinal edge of the body, a shaft extending through and shiftable in the tubular handle, means carried by the shaft at one end for engaging the body and holding the same against the concave side of the body, said handle having an opening in the wall thereof adjacent the end remote from the arcuate body, a spring surrounding said shaft and disposed within the handle, a member surrounding the shaft and freely movable thereon, a lever carried by said member and extending through the opening in the handle, means for selectively securing said lever in any position of adjustment longitudinally of the handle, and means secured to the shaft against which said member abuts to facilitate the movement of the shaft in one direction and the compression of the spring.

LEONARD A. LOPEZ.